United States Patent
Ekman et al.

(10) Patent No.: US 10,526,684 B2
(45) Date of Patent: Jan. 7, 2020

(54) PROCESS FOR RECOVERING COMPONENTS FROM PICKLING ACID RESIDUE

(71) Applicant: CrisolteQ Ltd, Harjavalta (FI)

(72) Inventors: Kenneth Ekman, Harjavalta (FI); Peik Ekman, Harjavalta (FI); Elina Lappalainen, Harjavalta (FI); Jan-Peter Blomquist, Harjavalta (FI)

(73) Assignee: CrisolteQ Ltd, Harjavalta (FI)

(*) Notice: Subject to any disclaimer, the term of this patent is extended or adjusted under 35 U.S.C. 154(b) by 0 days.

(21) Appl. No.: 16/162,443

(22) Filed: Oct. 17, 2018

(65) Prior Publication Data

US 2019/0119780 A1 Apr. 25, 2019

(30) Foreign Application Priority Data

Oct. 20, 2017 (FI) .................................. 20175928

(51) Int. Cl.
*C22B 7/00* (2006.01)
*C23G 1/36* (2006.01)
(Continued)

(52) U.S. Cl.
CPC ............ *C22B 7/007* (2013.01); *C01F 5/40* (2013.01); *C01G 37/00* (2013.01); *C01G 49/00* (2013.01);
(Continued)

(58) Field of Classification Search
CPC ... C01F 5/02; C01F 5/40; C01B 17/69; C01B 17/90; C01B 17/901; C23G 1/36; C01G 53/006; C01G 37/00; C01G 49/00; C01G 53/10; C22B 34/32; C22B 23/04; C22B 7/007
See application file for complete search history.

(56) References Cited

U.S. PATENT DOCUMENTS

| 2,433,458 A * | 12/1947 | Kahn ..................... C01F 5/22 423/142 |
| 4,565,675 A | 1/1986 | Uchino et al. |
| 2011/0308352 A1 | 12/2011 | Mäkelä et al. |

FOREIGN PATENT DOCUMENTS

| CA | 1077176 A | 5/1980 |
| CN | 104263943 B | 2/2017 |

(Continued)

OTHER PUBLICATIONS

Agrawal et al: An overview of the recovery of acid from spent acidic solutions from steel and electroplating industries. Journal of Hazardous Materials, Nov. 15, 2009, vol. 171, No. 1-3, pp. 61-75. XP027594413.

(Continued)

*Primary Examiner* — Timothy C Vanoy
(74) *Attorney, Agent, or Firm* — Seppo Laine Oy

(57) ABSTRACT

A novel process for treating and recovering valuable metals and other components from pickling acid residue (PAR) has been developed. The metals and other components are recovered by neutralizing the pickling acid residue using a magnesium compound or a mixture of magnesium compounds, and separating components of the resulting mixture (metals and sulfates) into products that can be reused, such as magnesium sulfate, nickel sulfate, iron and chromium phosphate, or various metal hydroxides or oxides.

10 Claims, 1 Drawing Sheet

(51) Int. Cl.
- *C01F 5/40* (2006.01)
- *C01G 37/00* (2006.01)
- *C01G 49/00* (2006.01)
- *C01G 53/10* (2006.01)
- C01F 5/02 (2006.01)
- C01G 53/00 (2006.01)

(52) U.S. Cl.
CPC ............... *C01G 53/10* (2013.01); *C23G 1/36* (2013.01); *C01F 5/02* (2013.01); *C01G 53/006* (2013.01)

(56) References Cited

FOREIGN PATENT DOCUMENTS

| | | |
|---|---|---|
| EP | 0161050 A1 | 11/1985 |
| FI | 58519 C | 2/1981 |
| GB | 2036573 A | 7/1980 |
| JP | H04293741 A | 10/1992 |
| RU | 2016113211 A | 10/2017 |
| WO | WO9504844 A1 | 2/1995 |
| WO | WO2010051992 A1 | 10/2010 |

OTHER PUBLICATIONS

Gentil et al: Evaluation des procédés de valorisation des sous-produits issus des lignes de décapage des aciers inoxydables. Application au procédé UG 3P. Revue De Metallurgie—Cahiers D'Informations Techniques, Jul. 1, 1992, vol. 89, No. 7-8, pp. 655-666.

Watanabe et al: A New Acid and Iron Recovery Process in Stainless Steel Annealing and Pickling Line. Kawasaki Steel Technical Report, vol. 14, Mar. 1986.

* cited by examiner

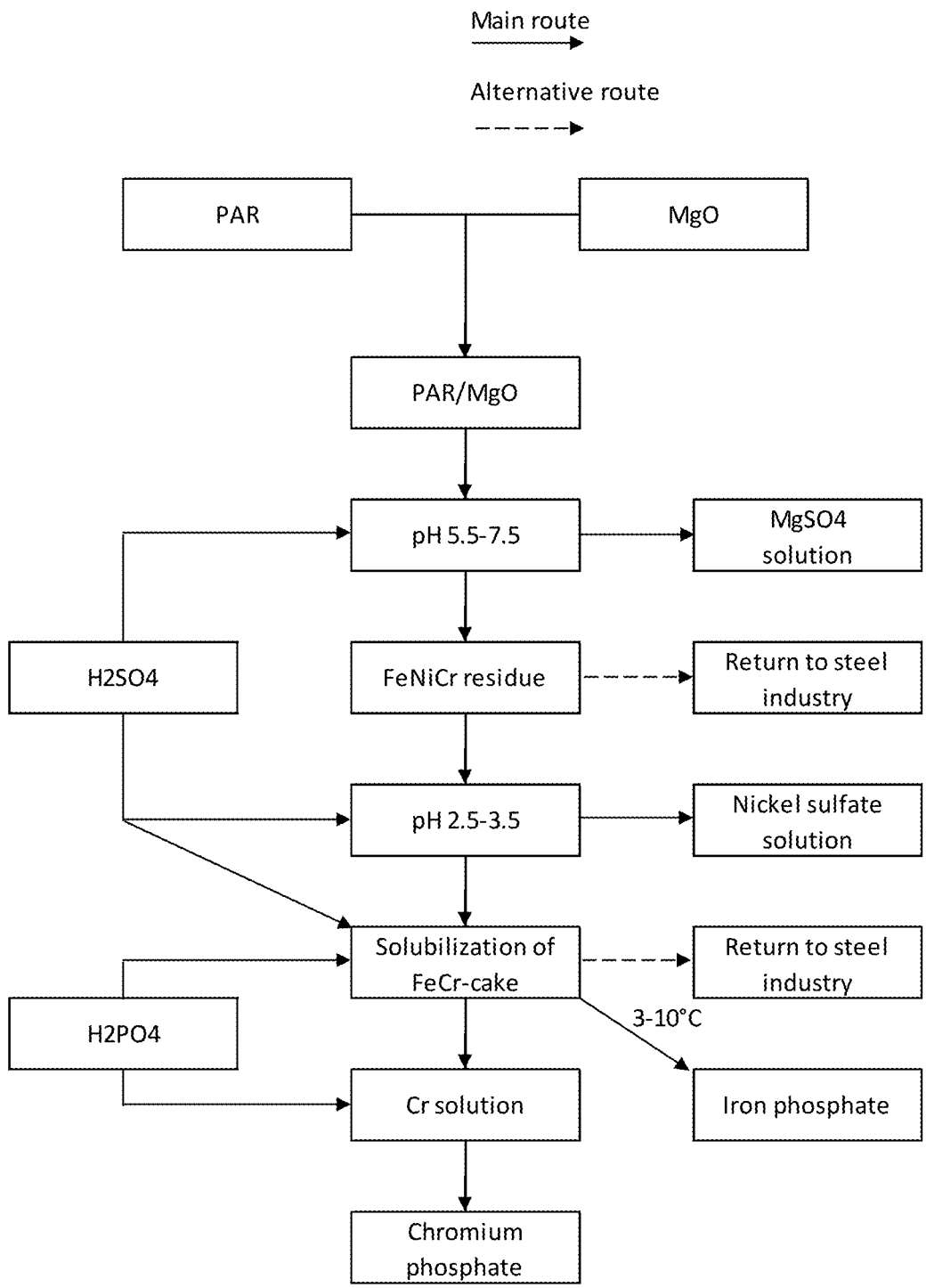

PROCESS FOR RECOVERING COMPONENTS FROM PICKLING ACID RESIDUE

FIELD OF THE INVENTION

This invention relates to the recovery of metals and other components from pickling acid residue (PAR). The metals and other components are recovered by neutralizing the pickling acid residue using a magnesium compound or a mixture of magnesium compounds, and separating components of the resulting mixture (metals and sulfates) into products that can be reused, such as magnesium sulfate, nickel sulfate, iron and chromium phosphate, or various metal hydroxides or oxides.

BACKGROUND OF THE INVENTION

Pickling is a process in stainless steel production that refers to treating the steel with a mixture of acids to remove metal oxides and chrome-depleted layers from the steel. For instance, stainless steel is usually pickled with a mixture of nitric/hydrochloric/hydrofluoric acid or a combination of sulfuric acid/hydrofluoric acid. This results in an acidic solution containing various metals (such as nickel, chromium and iron) and when the amounts of dissolved metals are too high, the pickling acids loses their effectiveness.

The primary acid used for pickling is hydrochloric acid, but a combination of various acids such as hydrofluoric, nitric, hydrochloric and sulfuric acid has also been a common choice. In automatic steel mills, hydrochloric acid is used as it pickles much faster while minimizing metal loss. Carbon steels with less than 6% alloy content are generally pickled in hydrochloric or sulfuric acids, while higher alloy content steels require a two-step pickling process using acids such as nitric, phosphoric or hydrofluoric acid. For rust and acid resistant steels, a pickling bath of nitric and hydrochloric acid is used.

Several different technologies have been developed to recycle the pickling acids and to recover the dissolved metals for re-use. Patent GB2036573 discloses the process of distillation of volatile acids in the presence of sulfuric acid and the recovery of the volatile acids by means of condensation. In a similar way, publication WO95/04844 discloses a process where volatile acids containing metal salt impurities, such as metal pickling solutions, are regenerated by a process in which the acid is subjected to sulfuric acid distillation. The resulting volatile acid vapor is condensed and recycled to the pickle tank, while the residual acid mixture is treated in an acid absorption unit, preferably of the acid retardation type. Acid absorbed in the acid absorption unit is periodically eluted with water and recycled, while metal impurities, in the form of sulfates are rejected, typically neutralized and discarded.

Publication WO2010/051992 discloses a process for complete recovery of metals and acids from solutions and sludge coming from stainless steel works. Volatile acids are recovered though distillation in the presence of sulfuric acid, while the metals are separately recovered in the form of hydroxides or salts. The metals are recovered by neutralization and precipitation with sodium hydroxide.

Current recovery efforts include ionic exchange methods, where metal ions are absorbed by an anionic bed, thus allowing the acids to be recycled back into the process. The metals can then be released with sedimentation and microfiltration of the bed, then regenerating the bed with water. Using this method, the need for new acids is reduced by 30 to 50% depending on the acid.

At Outokumpu steel mill in Tornio, Finland, a method for recycling of nitric and hydrofluoric acid uses evaporation, where sulfuric acid is first mixed into the pickling liquor, which in turn is then evaporated under vacuum at 80° C. The nitric and hydrofluoric acids evaporate and can be recycled, and the remaining material is a cake of metal sulfates and free sulfuric acid.

A common problem with metal recovery from pickling acid residues is filtration, as hydroxides tend to bind water and thus create a gel, making filtration difficult or impossible. Ferrous hydroxides are generally the most abundant hydroxides in pickling acid residues, and in European Patent Application Publication No. EP0161050, a method using solvent extraction to selectively remove $Fe^{3+}$ is described. This method, while effective in removing iron from the pickling waste, still leaves other metal ions in the solution, which is now very difficult to treat due to residual liquid from the solvent extraction.

Typically, the solution is treated with lime to neutralize the acids and the material is then landfilled. Alkali neutralization is commonly done with limestone, either as calcium carbonate, calcium oxide or calcium hydroxide. Alternatively, sodium hydroxide and potassium hydroxide can be used and are faster acting, requiring only about 5-10 minutes to fully neutralize any pickling waste in contrast to about 30 minutes when neutralized with limestone. While NaOH and KOH are more expensive chemicals, less is required, so both time and material is saved. However, limestone neutralization gives better sedimentation and dewatering properties of the formed hydroxides, reducing the chance of metal seepage into the environment. The divalent charge of calcium is the primary reason for this, as the ionic strength of the bond becomes more powerful.

To recover both the acids and the metals would be an important step towards a more economical and environmentally friendly process. The residue contains valuable metals in consistent concentrations, and could potentially be processed into metal products or used as raw material for other processes. Potentially the residue could be processed into raw material for the steel industry according to US patent publication 2011/0308352A1, where a mix of iron, chromium and nickel is made into a ferrochrome nickel product that can be used for stainless steel production.

SUMMARY OF THE INVENTION

A novel process for treating and recovering valuable metals and other components from pickling acid residue (PAR) has been developed. With this method, the sulfuric acid containing pickling acid residue, which contains nickel, chromium and iron as sulfates as well as free sulfuric acid, is neutralized with magnesium oxide, magnesium hydroxide or magnesium carbonate or with any combination thereof, preferably with magnesium oxide. Sulfates are then recovered as magnesium sulfate solution by leaching at neutral pH. In the optional following steps, the resulting residue containing iron, chromium and nickel is either further processed into products such as iron and chromium phosphate or nickel sulfate, or can be used as raw material in other processes.

According to the US patent publication 2011/0308352A1, residues containing iron, nickel and chromium (FeNiCr cake) and the cake containing iron and chromium (FeCr) could be processed into nickel-containing ferrochrome, which can then be used in the steel industry. In the method according to the US application nickel-containing material is mixed with iron-containing chromite concentrate and a binder, creating ferrochrome nickel.

According to a first embodiment of the present invention, the sulfuric acid containing pickling acid residue is mixed with at least one magnesium compound selected from the group consisting of magnesium oxide, magnesium hydroxide and magnesium carbonate to obtain a modified pickling acid having pH in the range of 7-10. The mixture is heated to 70-90° C. Magnesium is brought into solution from the modified pickling acid residue as magnesium sulfate at a stable pH in the range 5.5-7, optionally adjusting the pH with sulfuric acid to obtain stable pH. Magnesium sulfate is recovered as a magnesium sulfate solution by filtration and a FeNiCr residue is obtained as a precipitate.

According to a second embodiment of the present invention, the obtained FeNiCr residue is further slurried in water to obtain a FeNiCr slurry. Then the pH of the FeNiCr slurry is lowered using sulfuric acid to a range of 2.5-3.5 bringing nickel into solution from the FeNiCr slurry as nickel sulfate. The nickel sulfate is recovered as a nickel sulfate solution by filtration and FeCr residue is obtained as a precipitate.

In a third embodiment of the present invention the FeCr residue is further slurried in water to obtain a FeCr slurry. Then sulfuric acid is added to the FeCr slurry to obtain pH 0.5-1 and to dissolve solids. The slurry is then cooled to a temperature of 3-10° C. A stoichiometric amount based on expected iron content of phosphoric acid is added to the FeCr slurry. Iron is precipitated as iron phosphate by adjusting the pH with at least one magnesium compound selected from the group consisting of magnesium oxide, magnesium hydroxide and magnesium carbonate to the range of 2.5-3. The iron phosphate is recovered as a precipitate by filtration and a residual solution is obtained.

According to a fourth embodiment of the present invention a stoichiometric amount based on expected chromium content of phosphoric acid is added to the residual solution obtained in the previous step. The pH is adjusted to 4-6 with at least one magnesium compound selected from the group consisting of magnesium oxide, magnesium hydroxide and magnesium carbonate to precipitate chromium phosphate at a temperature of 50-60° C. and the precipitated chromium phosphate is recovered by filtration.

According to a fifth embodiment of the invention described as a "full metal processing" the sulfuric acid containing pickling acid residue (PAR) is mixed with at least one magnesium compound selected from the group consisting of magnesium oxide, magnesium hydroxide and magnesium carbonate to obtain a modified pickling acid residue having a pH in the range of 7-10. Then the magnesium is brought into solution from the modified pickling acid residue as magnesium sulfate by heating to 70-90° C. and optionally adjusting the pH with sulfuric acid until stable in the range of 5.5-7. Magnesium sulfate is recovered as a magnesium sulfate solution by filtration and a FeNiCr residue is obtained as a precipitate. The obtained FeNiCr residue is further slurried in water to obtain a FeNiCr slurry. The mixture is heated to 70-90° C. Then the pH of the FeNiCr slurry is lowered using sulfuric acid to a range of 2.5-3.5 bringing nickel into solution from the FeNiCr slurry as nickel sulfate. The nickel sulfate is recovered as a nickel sulfate solution by filtration and FeCr residue is obtained as a precipitate. The FeCr residue is further slurried in water to obtain a FeCr slurry. Then sulfuric acid is added to the FeCr slurry to obtain pH 0.5-1 and to dissolve solids. The slurry is then cooled to a temperature of 3-10° C. A stoichiometric amount, based on expected iron content, of phosphoric acid is added to the FeCr slurry. Iron is precipitated as iron phosphate by adjusting the pH with at least one magnesium compound selected from the group consisting of magnesium oxide, magnesium hydroxide and magnesium carbonate to the range of 2-3. The iron phosphate is recovered as a precipitate by filtration and a residual solution is obtained. Then a stoichiometric amount, based on expected chromium content, of phosphoric acid is added to the residual solution obtained in the previous step. The pH is adjusted to 4-6 with at least one magnesium compound selected from the group consisting of magnesium oxide, magnesium hydroxide and magnesium carbonate to precipitate chromium phosphate at a temperature of 50-60° C. and the precipitated chromium phosphate is recovered by filtration.

Then at least one magnesium compound selected from the group consisting of magnesium oxide, magnesium hydroxide and magnesium carbonate is preferably magnesium oxide. The magnesium compound can be magnesium hydroxide. It is also possible to use magnesium carbonate as the magnesium compound. Magnesium oxide, magnesium hydroxide and magnesium carbonate can also be used as a combination.

The at least one magnesium compound or the combination of magnesium oxide, magnesium hydroxide and magnesium carbonate can be used in dry form or as a water slurry.

BRIEF DESCRIPTION OF THE DRAWING

FIG. 1. A schematic process scheme is shown in FIG. 1.

DETAILED DESCRIPTION OF THE INVENTION

Typically, PAR contains iron, nickel and chromium in the form of sulfates. The iron content is expected to be in the range of 10-15%, while the nickel and chromium content is expected to be in the range of 2-5%. Sulfate content can be up to 60% of the total weight, out of which half is free sulfuric acid.

In the process according to the invention, the sulfuric acid containing pickling acid residue is treated in a stepwise process to recover desired components. The process steps needed depends on what components are recovered and what components are used as such for further processing.

According to one embodiment of the invention, sulfates and essentially all metals i.e. nickel, iron and chromium in the pickling acid residue can be recovered, described as "full metal processing".

According to another embodiment of the invention, the sulfates are recovered by neutralization and filtration and the iron-nickel-chromium-containing cake i.e. FeNiCr residue is used as such for other products.

In the following optional step, i.e. the second step according to the invention, nickel can be recovered and remaining FeCr residue can be used as such for other products or processed further according to the present invention. If the FeCr residue is processed further according to the present invention, iron can be separated in the next step. In the last i.e. in the fourth step according to the present invention, chromium can be recovered. In the following paragraphs, the invention is described in more detail step by step.

In the method according to the invention, sulphuric acid containing pickling acid residue (PAR) is neutralized with a magnesium compound or a mixture of magnesium compounds. PAR is neutralized with at least one magnesium compound selected from the group consisting of magnesium oxide, magnesium hydroxide and magnesium carbonate. Preferably PAR is neutralized with magnesium oxide. The magnesium compound or the mixture of magnesium compounds can be added either in dry form or as slurried in water. Depending on the magnesium compound or mixture of magnesium compounds used, the neutralization time varies. For example, with magnesium carbonate the neutralization time is longer than with magnesium hydroxide.

In the method according to the invention, the pickling acid residue, which can contain more than 60% of sulfates and thus has a pH of less than zero, is neutralized to obtain a pH in the range of 7-10 with one magnesium compound or with a combination of different magnesium compounds. By neutralizing with slaked magnesium oxide, magnesium hydroxide or magnesium carbonate or with any combination of these, preferably with slaked magnesium oxide, magnesium sulfate is formed. The magnesium compound(s) can be added either in dry form or as slurried in water. Subsequently, magnesium sulfate can be recovered by heating to 70-90° C., preferably at 80-85° C. and optionally leaching with sulphuric acid until stable in the pH range of 5.5 to 7, preferably at pH 6-6.5, and filtration of the liquor. In this step, more than 90% of all sulfates are recovered as magnesium sulfate. After separating the magnesium sulfate solution by filtration, the residue is a mix of iron, nickel and chromium hydroxides. This FeNiCr residue, i.e. FeNiCr cake, can then either be processed into a pigment by calcination, used as raw material in the steel industry, or further processed into metal salts using additional steps in the process according to the present invention.

According to another embodiment of the invention the process contains a second step, in which the FeNiCr residue from the first step is slurried in water and the pH is lowered with sulfuric acid to the range of pH 2.5 to 3.5, preferably 3 to 3.2 at a temperature of 70-90° C., preferably 80-85° C. This solubilizes nickel as nickel sulfate, and the residue is an iron and chromium hydroxide containing cake i.e. FeCr cake. The nickel is recovered as $NiSO_4$ solution by filtration. The FeCr residue can then either be processed into pigment by calcination, used as raw material in the steel industry, or further processed into metal salts in the process according to the present invention as detailed below.

According to a still further embodiment of the invention, the process comprises a third step, in which the residue i.e. the FeCr cake from the second step is slurried in water and the pH is lowered with sulfuric acid to pH 0.5-1 to completely dissolve the residue. The liquor is cooled to 3-10° C., preferably 5-8° C. A stoichiometric amount based on expected iron content of phosphoric acid is added, and the pH is increased with magnesium oxide, magnesium hydroxide, magnesium carbonate or with any combination thereof to the range of pH 2-3, preferably pH 2.5-3, to precipitate iron phosphate ($FePO_4$). Iron phosphate is separated by filtration.

For the full metal processing, to recover all possible metals from the pickling acid residue, a stoichiometric amount based on expected chromium content of phosphoric acid is added to the liquor from the third step. The pH is increased with magnesium oxide, magnesium hydroxide, magnesium carbonate or with any combination thereof to the range of pH 4-6, preferably pH 4.5-5, at 50-60° C. to precipitate chromium phosphate ($CrPO_4$). Chromium phosphate is separated by filtration.

Next, the invention is described with reference to the following examples, which are not intended to limit the scope of the invention.

EXAMPLES

Example 1

11 g of 93% magnesium oxide was slurried with 70 g of water and 30 g pickling acid residue solution, containing 50% PAR with a pH of less than 0, was added to produce a final volume of 100 ml. The pH of this mix was 8.7. The solution was heated to 80° C. and the pH was adjusted to 6 with 15 g of 93% sulfuric acid. pH was continuously adjusted for 3 hours, after which the solution was filtered and analysed using a microwave plasma-atomic emission spectrometer (MP-AES, Agilent Technologies). The results are presented in Table 1. The residual material (FeNiCr-cake) was then dried and analysed, and used for further processing.

TABLE 1

Metal analysis of Example 1 solution.

| Metal | mg/l |
|---|---|
| Ni | 20 |
| Cu | <20 |
| Mg | 60 400 |
| Fe | 30 |
| K | <50 |
| Ca | <50 |
| Mn | <20 |
| Cr | <20 |

Example 2

10 g FeNiCr-cake was slurried in 100 ml water and pH was lowered with sulfuric acid to pH 3 at 80° C. and adjusted until pH was stable. The solution was filtered and analysed for nickel content, presented in table 3. Yield was calculated to be 87%, and the residue was dried and used for further processing.

TABLE 2

Metal content of Example 2 solution.

| Metal | mg/l |
|---|---|
| Ni | 3 010 |
| Cu | 57 |
| Mg | 4 510 |
| Fe | <20 |
| K | 140 |
| Ca | 200 |
| Mn | 175 |
| Cr | <20 |

Example 3

3.58 g of residue from Example 2 was slurried in 50 ml water, heated to 80° C. and pH lowered to 0.7 with 5.5 g 93% sulfuric acid. The solution was filtered. The solution was cooled to 5° C., and a 1.5 ml of 85% phosphoric acid (i.e. a stoichiometric amount) was added and pH was increased to 2.5 with 5 g of 40% $Mg(OH)_2$ slurry. The solution was filtered and the precipitate dried and analysed using MP-AES. The results are presented in table 3.

TABLE 3

Metal contents and calculated yield of iron phosphate precipitate formed in Example 3.

| Metal | ppm | Yield (%) |
|---|---|---|
| Ni | 0 | 0 |
| Cr | 1 400 | 3 |
| Fe | 293 000 | 100 |
| P | 151 000 | 93 |

Example 4

26 ml solution from Example 3 was heated to 70° C., and 160 µl 85% phosphoric acid (i.e. a stoichiometric amount) was added. pH of the solution was increased to 5.2 with 0.43 g 40% $Mg(OH)_2$ slurry and the solution was allowed to precipitate for an hour. The solution was filtered and the precipitation was analysed, presented in table 4.

TABLE 4

Metal analysis of chromium phosphate precipitate from Example 4. Yield is calculated from the residue from Example 4.

| Metal | ppm | Yield (%) |
|---|---|---|
| Ni | 17 800 | 38.45 |
| Cr | 198 000 | 82.17 |
| Fe | 2 750 | 100 |
| P | 127 000 | 64 |

The invention claimed is:

1. A method for recovering sulfates and metals from a sulfuric acid containing pickling acid residue comprising the steps of:
   a) mixing the sulfuric acid containing pickling acid residue with at least one magnesium compound selected from the group consisting of magnesium oxide, magnesium hydroxide and magnesium carbonate to obtain a modified pickling acid residue having a pH in the range of 7-10,
   b) heating the modified pickling acid residue to a temperature of 70-90° C. and bringing magnesium into solution from the modified pickling acid residue as magnesium sulfate at a stable pH in the range 5.5-7, optionally adjusting the pH with sulfuric acid,
   c) recovering the magnesium sulfate as a magnesium sulfate solution by filtration, and
   d) obtaining a FeNiCr residue as a precipitate.

2. The method according to claim 1, wherein the method further comprises the steps of:
   a) slurrying the FeNiCr residue in water to obtain FeNiCr slurry,
   b) heating the slurry to 70-90° C. and lowering the pH of the FeNiCr slurry using sulfuric acid to a range of 2.5-3.5, bringing nickel into solution from the FeNiCr slurry as nickel sulfate,
   c) recovering the nickel sulfate as a nickel sulfate solution by filtration, and
   d) obtaining a FeCr residue as a precipitate.

3. The method according to claim 2, wherein the method further comprises the steps of:
   a) slurrying the FeCr residue in water to obtain FeCr slurry,
   b) heating the slurry to 70-90° C., adding sulfuric acid to the FeCr slurry to obtain pH 0.5-1 and to dissolve solids,
   c) cooling the slurry to a temperature of 3-10° C.,
   d) adding a stoichiometric amount based on expected iron content of phosphoric acid to the FeCr slurry,
   e) precipitating iron as iron phosphate by adjusting the pH with at least one magnesium compound selected from the group consisting of magnesium oxide, magnesium hydroxide and magnesium carbonate to the range of 2-3,
   f) recovering the iron phosphate as a precipitate by filtration, and
   g) obtaining a residual solution.

4. The method according to claim 3, wherein the method further comprises the steps of:
   a) adding a stoichiometric amount based on expected chromium content of phosphoric acid to the residual solution,
   b) adjusting pH to 4-6 with at least one magnesium compound selected from the group consisting of magnesium oxide, magnesium hydroxide and magnesium carbonate to precipitate chromium phosphate at a temperature of 50-60° C., and
   c) recovering the precipitated chromium phosphate by filtration.

5. The method according to claim 1, wherein the magnesium compound is magnesium oxide.

6. The method according to claim 1, wherein the magnesium compound is magnesium hydroxide.

7. The method according to claim 1, wherein the magnesium compound is magnesium carbonate.

8. The method according to claim 1, wherein the magnesium compound is a combination of magnesium oxide, magnesium hydroxide and magnesium carbonate.

9. The method according to claim 1, wherein the at least one magnesium compound or the combination of magnesium oxide, magnesium hydroxide and magnesium carbonate is added in dry form.

10. The method according to claim 1, wherein the at least one magnesium compound or the combination of magnesium oxide, magnesium hydroxide and magnesium carbonate is added as a water slurry.

* * * * *